Dec. 29, 1964  G. W. SCOTT  3,163,690
METHOD OF AND APPARATUS FOR MANUFACTURING HOLLOW
ARTICLES FROM ORGANIC PLASTIC MATERIAL
Filed March 5, 1962
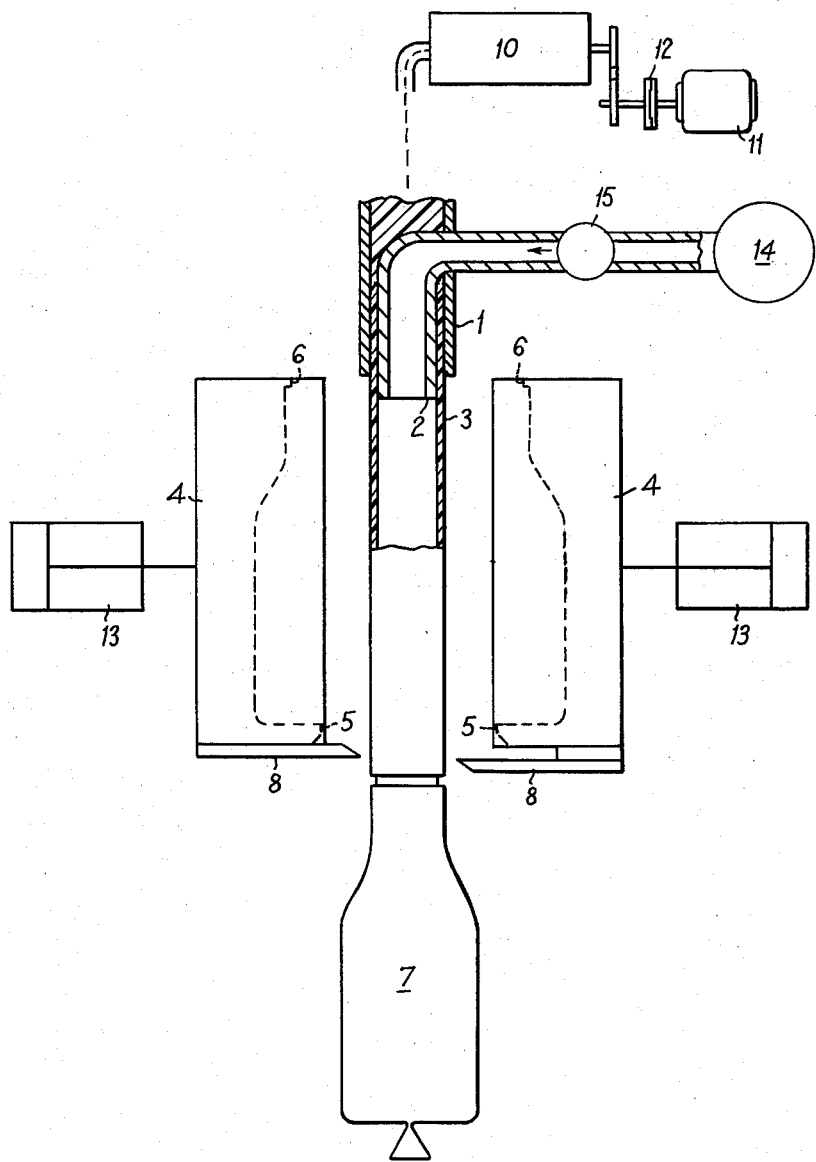
Inventor
G. W. Scott
By
Holcomb, Wetherill & Brisebois
Attorneys United States Patent Office 3,163,690
Patented Dec. 29, 1964

3,163,690
METHOD OF AND APPARATUS FOR MANUFACTURING HOLLOW ARTICLES FROM ORGANIC PLASTIC MATERIAL
Graham Walter Scott, Northwood Hills, Middlesex, England, assignor to E. Shipton & Co. (Engineering) Limited, Northwood Hills, England, a British company
Filed Mar. 5, 1962, Ser. No. 177,522
Claims priority, application Great Britain, Mar. 7, 1961, 8,269/61
4 Claims. (Cl. 264—98)

This invention relates to a method of and machine for the manufacture of bottles and other hollow articles from organic plastic materials in which the material in plastic form is extruded through an annular extrusion nozzle to form a tube of the plastic material of predetermined length, the extrusion then being stopped and the extruded tube being expanded by blowing to conform with the contour of a surrounding mould cavity to form the hollow article. More particularly the invention relates to a method and machine in which the blowing fluid is admitted through a passage in the core of the annular extrusion nozzle.

In known processes and machines of this kind, as described for example in Patents No. 2,724,860 issued November 29, 1955, and No. 2,854,691 issued October 7, 1958, after the article has been blown and the mould opened, the formed hollow article has to be ejected before the mould can again be closed. Generally safety interlock means are provided to ensure that the ejector has returned to its normal position before the mould can close. The time required for the ejector to operate slows down the cycle time of the machine and the present invention has for its object to provide a method and apparatus for manufacturing blown hollow articles in which the ejector device can be eliminated and in which extrusion can restart as soon as the mould opens, thereby reducing the cycle time and enabling the machine output to be increased.

To this end, the invention consists in the method of manufacturing blown hollow articles from organic plastic materials, which consists in extruding a length of plastic tube downwardly through an annular nozzle, stopping extrusion, closing a mould therearound so as to pinch the walls of the extruded length of tube together at the bottom of the mould cavity, blowing the length of tube enclosed within the mould cavity by admitting blowing fluid through a passage in the core of the annular nozzle, opening the mould, re-starting extrusion to extrude another length of plastic tube with the previously formed article suspended from the bottom thereof, again stopping extrusion and repeating the cycle of operations, and severing the previously formed article from the length of plastic tube thereabove which is next to be formed into a hollow article while extrusion is stopped. Preferably the severing of the previously formed article is effected by the closing of the mould around the next following extruded length of plastic tube.

The invention also consists in a machine for the manufacture of blown hollow articles from organic plastic materials, comprising a downwardly directed annular nozzle having a hollow core pin, means for extruding plastic material through said nozzle, means for starting and stopping extrusion, a multi-part mould mounted below said nozzle and associated with means for closing the mould around the tube to pinch the walls of the tube together at the bottom of the mould cavity and to close the upper part of the mould around the core pin, means for admitting blowing fluid through the passage in the core pin, and cutting blades mounted below the parts of the mould which pinch the tube, said cutting blades being actuated by movement of the moulds to the closed position to sever the plastic material depending below said pinch.

In the preferred form of carrying out the invention, a two-part mould is used and two cutters are mounted respectively at the bottom of the two mould parts so as to sever the plastic material depending below the mould cavity by a shearing action. The two cutters may be arranged with their cutting edges inclined to one another.

The accompanying drawing diagrammatically illustrates a part of the machine according to the invention. Plastic material from the extruder 10, driven by the motor 11 through a clutch 12, is fed to the downwardly directed annular nozzle with a hollow core pin 2, the plastic being extruded through the nozzle as a plastic tube 3. The two mould parts 4 are shaped to form the mould cavity and are provided with lands 5 at or near the bottom to pinch the walls of the tube together when the mould parts are closed. The mould parts are closed and opened by any convenient mechanism diagrammatically represented by the pistons 13, under control of a timing device. When the mould parts are closed, the upper ends 6 of the mould parts close around the core pin 2, the passage through which is connected to a supply of compressed air 14 via a control valve 15 which is operated in known manner to blow the hollow article when the mould is closed.

Extrusion is stopped while the mould is closed and the hollow article is being blown. This may be effected by disengaging the clutch 12, or by changing over a valve in the outlet from the extruder as described in the aforesaid patents. After the article has rigidified, the mould 4 is opened and extrusion restarted so that the formed hollow article 7 moves downwards suspended from the bottom of the plastic tube 3 as shown. When the required length of tube 3 is extruded to move the article 7 below the mould parts 4, extrusion is stopped and the mould parts closed.

Carried from the bottoms of the mould parts 4 are two cutting blades 8, which, when the mould parts close, sever the plastic tube 3 below the mould and thereby allow the previously formed article 7 to fall into a box or on to a chute or conveyor.

With the arrangement described, the cutting members usually provided at the top of the mould may be dispensed with. However, if desired, they may be retained and the formed article be severed by tearing the plastic at the weakening produced by said cutting members, for example by pulling the article downwards while the mould is closed and after the formed article has been lowered below the mould parts to the position shown in the drawing.

I claim:
1. The method of manufacturing blown hollow articles from organic plastic materials, which consists in extruding a length of plastic tube downwardly through an annular nozzle, stopping extrusion, closing a mould therearound so as to pinch the walls of the extruded length of tube together at the bottom of the mould cavity, blowing the length of tube enclosed within the mould cavity by admitting blowing fluid through a passage in the core of the annular nozzle, opening the mould, restarting extrusion to extrude another length of plastic tube with the previously formed article suspended from the bottom thereof, again stopping extrusion and repeating the cycle of operations, and cutting the previously formed article from said another length of plastic tube thereabove simultaneously with the closing of the mould around said another length of plastic tube.

2. A machine for the manufacture of blown hollow articles from organic plastic materials, comprising a downwardly directed annular nozzle having a hollow core pin, means for extruding plastic material through said nozzle, means for starting and stopping extrusion, a multi-part mould mounted below said nozzle and associated with means for closing the mould around the tube to pinch the walls of the tube together at the bottom of the mould cavity and to close the upper part of the mould around the core pin, means for admitting blowing fluid through the passage in the core pin, and cutting blades mounted below the parts of the mould which pinch the tube, said cutting blades being actuated by movement of the moulds to the closed position to sever the plastic material depending below said pinch.

3. A machine as claimed in claim 2, comprising a two-part mould having two cutters mounted respectively at the bottom of the two mould parts so as to sever plastic material depending below the mould cavity by a shearing action.

4. In the art of blow-moulding hollow articles from organic plastic materials, a mould comprising two parts each having a face with a moulding cavity therein said two parts being adapted to be closed together face-to-face along a split line to define a mould cavity therebetween with an opening at its upper end to receive a plastic tube from which an article is to be blown, lands at the bottom of the cavity to pinch the walls of the plastic tube together thereat, a first cutting blade carried at the bottom of one mould part and projecting beyond the face thereof defining said split line and a second cutting blade carried at the bottom of the other mould part and projecting beyond the face thereof defining said split line, said first and second cutting blade being arranged to move past one another with a cutting action when the mould parts are closed together.

References Cited in the file of this patent
FOREIGN PATENTS

| | | |
|---|---|---|
| 221,038 | Australia | Mar. 27, 1958 |
| 1,247,323 | France | Oct. 24, 1960 |